Patented July 15, 1941

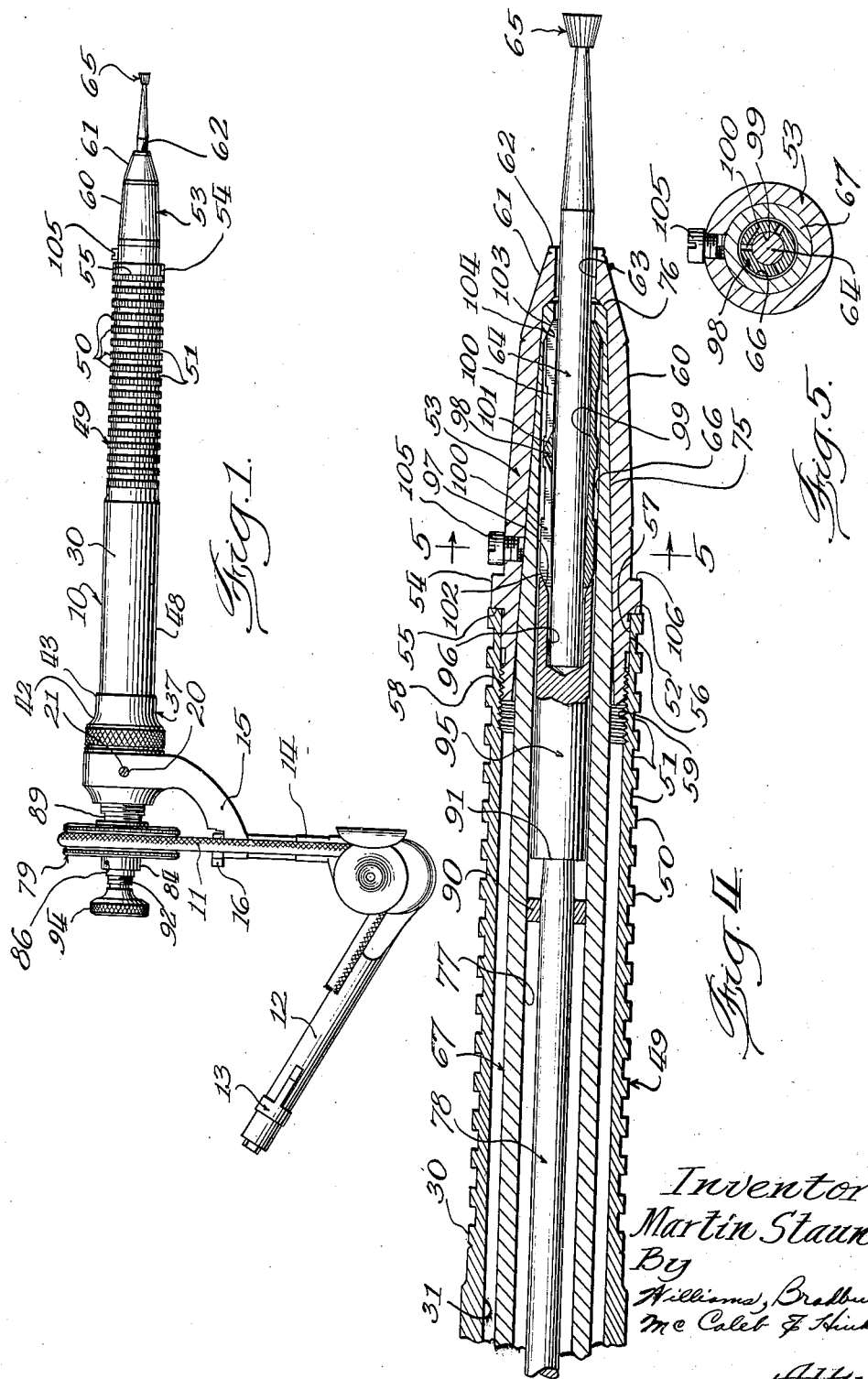

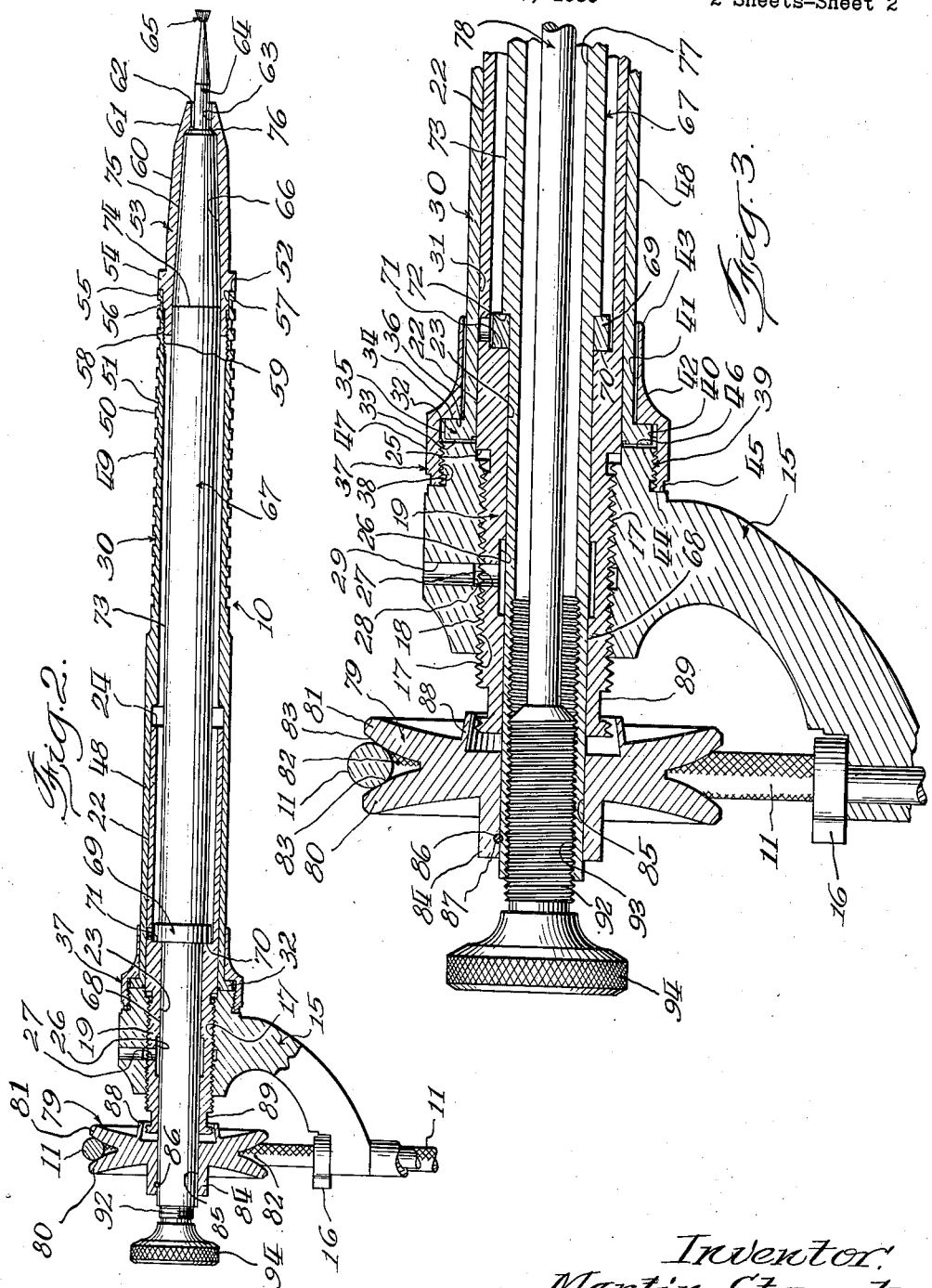

2,249,058

UNITED STATES PATENT OFFICE 2,249,058

DENTAL HAND PIECE

Martin Staunt, Chicago, Ill.

Application November 17, 1939, Serial No. 304,832

1 Claim. (Cl. 32—26)

The present invention relates to dental hand pieces, and is particularly concerned with the provision of an improved structure of a dental hand piece by means of which an accurate axial alignment of the bearings is assured, and the hand piece is adapted to rotate more smoothly and have better operating characteristics than the devices of the prior art.

One of the objects of the invention is the provision of an improved dental hand piece which is adapted to operate more smoothly and with less vibration and wear than any of the devices of the prior art.

Another object of the invention is the provision of an improved dental hand piece having special provision for lubrication, which assures its operation over a long period of time without necessity for any attention.

Another object of the invention is the provision of an improved bearing structure and assembly for dental hand pieces by means of which the axial alignment of the bearings is assured without entailing any difficulties in the manufacture, so that the hand pieces of the present invention are adapted to operate more smoothly and with less noise and less vibration than any of the devices of the prior art.

Other objects and advantages of the present invention will be apparent from the following description and the accompanying drawings, in which similar characters of reference indicate similar parts throughout the several views.

Referring to the drawings,

Fig. 1 is a side elevational view of a hand piece embodying the invention;

Fig. 2 is an enlarged (one and one-half size) sectional view, taken on a plane passing through the axis of the hand piece, with the spindle in elevation;

Fig. 3 is a fragmentary sectional view, taken on the same axis, with the spindle in section, but showing the clutch-controlling member in elevation;

Fig. 4 is a fragmentary sectional view of the other end, that is, the chuck end of the hand piece, taken on the same plane as Fig. 3, with certain parts in elevation, to show the structure;

Fig. 5 is a transverse sectional view, taken on the plane of the line 5—5 of Fig. 4, looking in the direction of the arrows.

Referring to Figs. 1 and 2, 10 indicates in its entirety a dental hand piece constructed according to the invention and adapted to be driven by a conventional dentist's engine, by means of a belt 11. The supporting arm 12 is adapted to be secured to the engine arm by means of a spring catch 13 of the type disclosed in my prior application, filed October 22, 1938, Serial No. 236,423, and the arm 12 is pivotally secured to the lower end of a second arm 14, which has pivotal engagement in the end of a wrist arm 15.

A stop member 16 limits the pivotal movement of the wrist arm 15 on the member 14. The wrist arm 15 comprises a curved metal member having a threaded bore 17, which is at right angles to the bearing for the arm 14 in the wrist arm 15. The bore 17 has threaded engagement with the reduced threaded portion 18 (Fig. 3) of a bearing member 19, and the wrist arm may be fixedly secured to the bearing 19 by means of a set screw 20 (Fig. 1), which is threaded into a threaded bore 21 and adapted to engage the threads 18.

The bearing member 19 comprises a very important part of the invention, and it is preferably made of steel, and is accurately machined and ground to have the external cylindrical surface 22 accurately concentric with the inner cylindrical bearing surface 23.

This may be accomplished without difficulties in manufacture because both of these surfaces are located on the same integral piece, and the structure is such that there is no possibility of the later manipulation or assembly of the device causing these surfaces to get eccentric with respect to each other.

In this the present device must be carefully distinguished from the devices of the prior art, in which the bearing surfaces intended to support similar parts are located on separate pieces that are secured together either by threads or fixed in position by set screws which drive one part into an eccentric position.

The action of a set screw in this manner is illustrated by the action of the set screw 20 in the wrist arm 15, but, of course, the eccentric location of the bore of the wrist arm on the bearing has no effect on the operation of the device, since the wrist arm is already an eccentric member.

The cylindrical surface 22 is preferably elongated, as shown in Fig. 2, where it is many times longer than its diameter, the end of the bearing being at 24, and the cylindrical surface 22 is preferably of larger diameter than the reduced threaded portion, forming an annular shoulder at 25.

Both surfaces 22, 23 are accurately ground and finished so as to be provided with a close rotating fit with the other parts with which they engage.

The inner cylindrical bearing surface 23 is also preferably provided with an annular groove 26, which communicates with a bore 27, passing through the bearing 19. The bore 27 communicates with an annular groove 28, located in the bore 17 of the wrist arm, and the annular groove 28 communicates with a bore 29 through the hub of the wrist arm. The bore 29, annular groove 28, bore 27, and annular groove 26 serve as reservoirs for storing and distributing lubricant, which spreads over the bearing surface 23 and serves to lubricate the moving parts of the hand-piece for long periods of time.

The outer cylindrical bearing surface 22 of the bearing 19 rotatably supports a sheath or sleeve 30, adapted to serve as a handle. Sheath or sleeve 30 comprises a tubular metal member which is provided with an accurately machined and ground inner cylindrical surface 31 for engaging the outer cylindrical surface 22 on the bearing 19.

It is also provided with a radially extending flange 32, which is substantially rectangular in cross section and provided with a flat end surface 33, the flat annular shoulder 34, and cylindrical periphery 35.

The flange 32 serves as a means for effecting the securement of the sleeve 30 to the wrist arm 15 in such manner as to permit rotation between these parts. This flange is engaged by an annular shoulder 36 carried by a threaded collar 37. The threaded collar 37 is a member having a substantially cylindrical body flange which is provided with a threaded bore 38 for engaging the complementary threaded portion 39 on the wrist arm 15.

The bore 38 is also provided with another threaded portion 40, and is terminated by the annular shoulder 36, which engages the annular surface 34 on the sleeve 30.

The collar 37 is provided with a counterbore 41 surrounding the sleeve 30, but having a suitable clearance with the sleeve and the surface of the collar may be curved at 42, and the thickness of the collar tapered down to a thin edge 43.

The end 44 of the collar abuts against an annular shoulder 45 on the wrist arm, which serves to determine the final position of the collar 37 when it is threaded home on the threads 39. This position is such that there is a suitable clearance between the sides 33 and 34 of flange 32, and the adjacent part 36 of the collar, and the end 46 of the wrist arm, to permit free rotation of the sleeve 30 within the collar 37.

The outer cylindrical surface 47 of the collar 37 may be knurled to facilitate the collar being turned by hand in taking the device apart. The sheath 30 may be provided with a smooth cylindrical outer surface at 48 adjacent its left end (Fig. 2), but at its right end in Fig. 2 it is provided with a gripping surface 49, which is formed by means of a plurality of knurled ridges 50 of rectangular cross section, separated by a plurality of grooves 51 of rectangular cross section.

The end 52 of the sheath 30 is a plane annular surface, and is accurately machined and ground at right angles to the axis of the sheath for a purpose to be described.

At its right end (Fig. 2) the sheath 30 fixedly supports a lower bearing member 53 in accurate concentric position with respect to the cylindrical surfaces of the bearing 19 and the cylindrical surface 31 in the sheath 30. This is accomplished by making the bearing member 53 of the following structure.

The bearing member 53 comprises a substantially cylindrical metal member at its left end in Fig. 2, but it is provided with an annular radially projecting flange 54 of substantially rectangular cross section, having a plane annular shoulder 55. The annular shoulder 55 engages flatly against the flat end 52 on the sheath 30, and is a part of the means for assuring the accurate concentric location of the bearing 53 with respect to the axis of sleeve 30.

In addition to these surfaces, the bearing 53 is provided with an outer cylindrical surface 56, which engages an inner cylindrical surface 57 in the sleeve. The outer cylindrical surface 56 is accurately machined and ground to be concentric with respect to the axis of bearing 53.

The inner cylindrical surface 57 of sleeve 30 is accurately machined and ground to be concentric with respect to the axis of the sleeve 30, and the surfaces 56 and 57 are a close fit together. They are so closely fitted that they determine the axial position of the bearing 53 with respect to the sleeve 30, although the bearing 53 is actually secured in place by external threads 58 on the end of the reduced portion of the bearing and the internal threads 59 inside the sleeve 30.

Such threaded connections would not of their own structure assure the location of the bearing 53 concentrically with respect to the axis of the sleeve 30. There is a certain amount of play necessary between threads, and threads may also get out of concentric relation, due to the fact that the parts of the threads are cut in material which may be softer at one side of the bearing than at another.

The bearing head 53 has a tapered outer surface at 60, and at its extreme end it has another taper 61, terminating at a flat end portion 62. There is a bore 63 in the end of the bearing 53 for passing the shank 64 of a burr 65 or other suitable tool.

The bearing surface in the bearing 63 consists of an inner frusto-conical surface 66, which is accurately machined and ground to be concentric with respect to the surface 56.

In order to assure this, the tapered surface 66 in the bearing is further improved by grinding it in with the spindle 67 in running position. The spindle 67, like all of the other parts of the handpiece, comprises a member made of good quality steel, which is provided with a substantially cylindrical bearing surface 68, at the left end of Fig. 2.

The bearing surface 68 engages the inner bearing surface 23 in the bearing 19, whereby the spindle is rotatably supported at the left end in Fig. 2. The spindle is preferably provided with an annular collar or flange 69, which may be rectangular in cross section and provided with an annular flange 70 engaging an annular shoulder 71 in the bearing 19.

The collar 69 is a tight frictional fit on the cylindrical surface 68, and it abuts against an annular shoulder 72 on the body of the spindle. The spindle is also provided with a cylindrical body 73, which may be slightly larger, and which extends to the point 74 at the right end of the spindle, where the spindle has an outer frusto-conical surface 75.

The end of the spindle is chamfered at 76, and the spindle is provided with a through bore 77 (Fig. 4), which supports a chuck and an actuating member 78 for controlling the chuck. The frusto-conical surface 75 is accurately concentric with respect to the cylindrical surface 68, both being referred to the axis of the spindle.

At its left end the spindle is provided with a pulley 79, having a pair of radially extending flanges 80, 81, defining a substantially V-shaped groove 82, by means of the outwardly curved surfaces 83, 83. The groove 82 is adapted to engage the belt 11.

The pulley 79 has an elongated cylindrical hub 84 and has a centrally located bore 85, which fits on the cylindrical part 68 of the spindle 67. The pulley 79 is fixed against rotation on the spindle and against longitudinal movement by means of a transverse metal pin 86, which is located partly in a groove 87 in the spindle 67, and partly in the body of the hub 84.

The groove 87 is a substantially cylindrical groove, fitting the pin 86; and by virtue of the engagement of its length with the pin 86, rotation is prevented, and the sides of the groove 87 engage the sides of the pin 86 and prevent longitudinal movement of the pulley 79 on the spindle 67.

The pulley 79 may be provided with a skirt 88, surrounding the end of the bearing 19. A pair of flattened surfaces 89 on the bearing 19 serve to be engaged by a wrench in the assembly or taking apart of the handpiece.

The spindle 67 may be provided with any conventional type of chuck, but the chuck is preferably of the construction shown in Figs. 2 to 4. The chuck-controlling member comprises an elongated steel rod of substantially cylindrical shape, having an annular guide collar 90 adjacent its flat end 91. The guide collar 90 assures the axial location of the rod 78 at this end. At its other end the rod 78 is provided with an enlarged threaded portion 92, engaging the inner threaded portions 93 in the bore of the spindle 67.

A knurled head 94 on the rod 78 serves to permit its rotation by the fingers. The end 91 of the rod 78 is adapted to engage a sliding cylindrical member 95, which is slidably mounted in the bore 77 and provided with a cylindrical bore 96 for receiving the end of the cylindrical shank 64.

The sliding member 95 has an inner frusto-conical surface 97 concentric with and communicating with the bore 96 and adapted to engage the split sleeve 98. The split sleeve 98 comprises a substantially cylindrical metal member, which is provided with an internal bore 99 of a size adapted to receive the shank 64.

The chuck sleeve 98 has a plurality of longitudinally extending slots 100, extending toward both ends, but terminating adjacent the middle or bridge 101. At each end the chuck sleeve 98 has a frusto-conical surface 102, 103. The surface 102 engages inside the surface 97, and the camming action between these two surfaces causes the parts of the sleeve 98 to clamp the shank 64 when the sliding member 95 is urged toward the right in Fig. 4 by the rod 78.

The same sort of action between the frusto-conical surface 103 and the inner frusto-conical surface 104 in the spindle bore serves to cause that end of the chuck sleeve 98 to clamp the shank 64 at that end. Thus the shank of a tool, such as 65, may be clamped in the spindle by means of the chuck described.

The headed screw 105, which is secured in a threaded bore adjacent the annular shoulder 106 on the bearing member 53, serves to engage and prevent rotation between the handpiece and a contra-angle, which may be mounted on the end of the handpiece, as disclosed in my prior application mentioned above.

The operation of the handpiece will be evident from the description of its parts and their operation. The end play between the spindle and the ends of the bearings may be taken up by the adjustment of the bearing 19 in the threaded bore 17 by means of threads 18 and secured in place by set screw 20. If at any time the handpiece shows wear, the wear may be taken up by this longitudinal adjustment.

Since the bearing 19 is made of one piece, with its inner and outer bearing surfaces accurately concentric, and since there are no threaded connections or set screws in the device, which might change the concentricity of these parts, the sleeve 30 is accurately concentric with respect to the inner bearing surface 23 of the bearing 19, and the sleeve 30 is adapted to support the lower bearing 53 in accurate concentric position with respect to the first-mentioned bearing surface 23.

This assures accurate alignment of the two bearings 19 and 23 for the spindle 67, and the spindle in the present invention is adapted to rotate with a smoothness and lack of vibration that I have not found in any of the devices of the prior art.

The present handpiece is simpler in construction, and adapted to be maintained in good running condition for a longer period of time than any of the devices of the prior art. Its development is the result of long years of experience in the repair of the devices of the prior art; and by means of its provision for lubrication, the present invention is also assured of proper and adequate lubrication for a long period of time without additional attention.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a dental handpiece, the combination of a main bearing member having inner and outer concentric cylindrical bearing surfaces, said inner bearing surface being provided with an annular groove forming a lubricant reservoir, with a spindle, having one end rotatably mounted in said inner cylindrical bearing surface, and forming a part of the walls of said reservoir, a handle sleeve mounted on said outer cylindrical bearing surface by means of an inner cylindrical bearing surface in said sleeve, said sleeve having a radially outwardly extending flange, and said sleeve carrying at its opposite end a bearing member having a bearing surface concentrically located with respect to the first-mentioned inner bearing surface of said sleeve, said spindle having at the corresponding end a bearing surface engaging in said bearing member carried by said sleeve, a wrist arm fixedly secured to said main bearing member, said wrist arm having threaded engagement with said main bearing member, and having a lubricant aperture, and said wrist arm having an annular groove communicating with said latter aperture and communicating with an aperture extending through said main bearing into said reservoir.

MARTIN STAUNT.